(12) United States Patent
Kershaw et al.

(10) Patent No.: US 8,132,254 B2
(45) Date of Patent: Mar. 6, 2012

(54) PROTECTING SYSTEM CONTROL REGISTERS IN A DATA PROCESSING APPARATUS

(75) Inventors: Daniel Kershaw, Cambridge (GB); Richard Roy Grisenthwaite, Guilden Morden (GB)

(73) Assignee: ARM Limited, Cherry Hinton, Cambridge (GB)

( * ) Notice: Subject to any disclaimer, the term of this patent is extended or adjusted under 35 U.S.C. 154(b) by 1237 days.

(21) Appl. No.: 11/889,644

(22) Filed: Aug. 15, 2007

(65) Prior Publication Data

US 2008/0046762 A1  Feb. 21, 2008

(30) Foreign Application Priority Data

Aug. 16, 2006 (GB) .................................. 0616309.1

(51) Int. Cl.
  *G06F 21/00* (2006.01)
(52) U.S. Cl. ......................... 726/18; 713/193
(58) Field of Classification Search .................. None
  See application file for complete search history.

(56) References Cited

U.S. PATENT DOCUMENTS

| 4,580,246 | A | | 4/1986 | Sibigtroth | |
|---|---|---|---|---|---|
| 5,043,878 | A | * | 8/1991 | Ooi | 712/42 |
| 5,161,122 | A | * | 11/1992 | Robertson | 711/163 |
| 7,124,170 | B1 | * | 10/2006 | Sibert | 709/216 |
| 7,305,534 | B2 | | 12/2007 | Watt et al. | |
| 2003/0140238 | A1 | | 7/2003 | Turkboylari | |
| 2004/0177261 | A1 | | 9/2004 | Watt et al. | |

* cited by examiner

OTHER PUBLICATIONS

UK Search Report for GB 0616309.1, date of search: Oct. 24, 2006.

*Primary Examiner* — Gilberto Barron, Jr.
*Assistant Examiner* — Shaun Gregory
(74) *Attorney, Agent, or Firm* — Nixon & Vanderhye P.C.

(57) ABSTRACT

A data processing apparatus and method for protecting system control registers is provided. Processing logic is providing for executing software routines and a plurality of system control registers are used to store access control information for a plurality of system resources available to the processing logic when executing at least some of those software routines. Additionally, at least one write control register is provided, with each field of that register being associated with one or more of the system control registers. Disable control logic is used to generate a disable signal, and when that disable signal is clear access control information can be written into the system control registers, and write restriction data can be written into each of the fields of the at least one write control register. Then, when the disable control logic sets the disable signal, the at least one write control register becomes read only, and for each field that has write restriction data therein those associated system control registers indicated by the write restriction data also become read only. This mechanism provides a very flexible approach for programming which system control registers are to be treated as read only registers.

18 Claims, 5 Drawing Sheets

| FIELD 0 | FIELD 1 | FIELD 2 | FIELD 3 | FIELD 4 | FIELD 5 | SYSYEM CONTROL REG | WRITE ALLOWED |
|---|---|---|---|---|---|---|---|
|  | X |  |  |  |  | 0 | X |
|  | X |  |  |  |  | 1 | X |
|  |  | X |  |  |  | 2 | X |
|  | X | X |  |  |  | 3 | X |
|  |  |  |  |  |  | 4 | ✓ |
|  |  |  |  |  |  | 5 | ✓ |
|  |  |  |  |  |  | 6 | ✓ |
|  |  | X |  |  |  | 7 | X |
|  |  |  |  |  |  | 8 | ✓ |
|  |  |  |  | X |  | 9 | X |

PROTECTING SYSTEM CONTROL REGISTERS IN A DATA PROCESSING APPARATUS

TECHNOLOGY OVERVIEW

The technology described in this application relates to techniques for protecting system control registers in a data processing apparatus.

BACKGROUND

In a data processing apparatus having processing logic for executing software routines, it is known to provide a plurality of system control registers for storing access control information for a plurality of system resources available to that processing logic when executing at least some of those software routines. The access control information can take a variety of forms. For example, for processing logic in the form of a processor core that issues memory access requests specifying virtual addresses, various of the system control registers may provide pointers to page tables in memory identifying a mapping to be used to convert virtual addresses into physical addresses, along with various memory region attributes and/or access permissions to be used in relation to such access requests. Similarly, for a processing unit which directly employs physical addresses, it is known for such system control registers to directly specify memory attributes and/or access permissions to be used when accessing particular memory regions.

In addition to storing access control information pertaining to memory, it is also known for such system control registers to provide access control information for other system resources, for example by containing pointers to exception vector tables identifying software routines to be executed on occurrence of particular types of exceptions within the system.

Typically the system control registers are arranged to only be updated by trusted software executing on the associated processing logic, for example operating system software running in a predetermined privileged mode of operation. In another example, the trusted software may be software executing in a particular domain provided by the data processing apparatus. For example, to seek to alleviate the reliance on operating system security, it is known to provide a system in which the data processing apparatus is provided with separate domains, these domains providing a mechanism for handling security at the hardware level. Such a system is described, for example in commonly assigned U.S. Pat. No. 7,305,534, the contents of which are herein incorporated by reference, this application describing a system having a secure domain and a non-secure domain. In that system, the non-secure and secure domains in effect establish separate worlds, with the secure domain providing a trusted execution space separated by hardware enforced boundaries from other execution spaces, and likewise the non-secure domain providing a non-trusted execution space. Within such a system, the trusted software used to update the system control registers may be software executing in a predetermined mode of operation within the secure domain.

With the aim of further increasing the security of the system control register contents, it is known to provide a predetermined list of system control registers which once they have been initially written to are enforced to be read only. Typically, this mechanism can be invoked by issuing a disable signal which when set causes that fixed predetermined list of system control registers to become read only.

However, by enforcing a predetermined fixed list of system control registers to become read only, this places significant restriction on the various usage models of the data processing apparatus. Accordingly, it will be desirable to provide a more flexible approach for protecting system control registers.

SUMMARY

Viewed from a first aspect, the technology described in this application provides a data processing apparatus comprising: processing logic for executing software routines including a system control register setting routine; a plurality of system control registers for storing access control information for a plurality of system resources available to the processing logic when executing at least a subset of said software routines; at least one write control register containing one or more fields, each field being associated with one or more of the system control registers; and disable control logic for generating a disable signal, when the disable signal is clear the system control register setting routine being operable to write access control information in said system control registers, and for each of said one or more fields to selectively provide write restriction data in that field; when the disable control logic sets the disable signal, the at least one write control register only being readable by any software routines of said subset, and for each field that has write restriction data therein those associated one or more system control registers indicated by the write restriction data also only being readable by any software routines of said subset.

The data processing apparatus provides at least one write control register which contains one or more fields, with each field being associated with one or more of the system control registers. The mapping between each field and the associated one or more system control registers will typically be predetermined, but in an alternative embodiment such mappings could be programmable by trusted software. When a disable signal is clear, access control information can be written in the system control registers, and in addition, write restriction data can selectively be provided in each of the fields of the at least one write control register. Thereafter, when the disable signal is set, the at least one write control register becomes read only and hence the fields therein cannot be tampered with. For each field that has write restriction data provided therein, those associated one or more system control registers indicated by the write restriction data are also read only and hence their contents cannot be tampered with.

Hence, for any software routines that are able to reference the system control registers, those software routines will not be able to alter the contents of any of those system control registers marked as read only in the above manner. However, the exact choice as to which of the system control registers are arranged to be read only is programmable by the write restriction data stored in the one or more fields of the at least one write control register whilst the disable signal is clear, and accordingly this provides a great deal of flexibility. Further, certain system control registers can be retained as both readable and writeable even when the disable signal is set, so that a trusted software routine executed on the processing logic can still alter the contents of those system control registers.

It should be noted that for the system control registers that are marked as read only through appropriate setting of write restriction data in the relevant field or fields of the at least one write control register, those system control registers are not updatable even by the system control register setting routine (which would normally be considered a trusted software routine) that initially wrote to those registers when the disable flag was clear, thereby providing an enhanced level of security to those system control registers. In particular, even if that trusted software routine later becomes compromised in some way, it is still unable to alter the contents of such system control registers, and accordingly cannot alter the access control information for the related system resources.

As a result, the technology described in this application provides the programmer with a great deal of flexibility as to which system control registers are chosen to be read only, and thus provides the programmer with a richer set of usage models.

In one embodiment, additional system control registers can be provided which are not mapped into fields of the write control register, and accordingly there can be additional system control registers which will always be read only when the disable flag is set, and indeed there may be other system control registers which are always readable and writeable irrespective of whether the disable flag is set.

The write restriction data can take a variety of forms. In one embodiment, each field in the at least one write control register may be a single bit field, in which event the write restriction data is a single bit flag which is set to indicate that the associated one or more system control registers should become read only, and is clear to indicate that the associated one or more system control registers should be both readable and writeable. In one embodiment, the "set" condition may be indicated by a logic "1" value, and the "clear" condition by a logic "0" value. Alternatively, the opposite may be the case (set indicated by 0, clear by 1).

In an alternative embodiment, at least one of the fields is a multi-bit field which can store a value identifying which of the associated one or more system control registers should become read only once the disable signal is set.

The manner in which the system control register setting routine is executed can take a variety of forms. However, in one embodiment, the system control register setting routine is executed as part of a boot process, and during said boot process the disable signal is clear.

In one such embodiment, the disable control logic is operable to set the disable signal following elapse of a timer started during said boot process. Accordingly, such an approach gives the system control register setting routine a predetermined period of time in which to program up the required system control registers and the at least one write control register, whereafter the disable flag is set to lock down the at least one write control register, and any system control registers indicated therein, as reed only registers.

Alternatively, the disable control logic is operable to set the disable signal on receipt of a signal issued by the processing logic during said boot process. Accordingly, in such an embodiment, instead of using a fixed timer, the processing logic itself can issue a signal to cause the disable signal to be set. In a further embodiment, this mechanism can be combined with the timer mechanism, such that the processing logic can signal when to set the disable signal, but if this does not occur by the time the timer has expired, the expiry of the timer will in any event cause the disable signal to be set. Accordingly, even if the boot process fails at some point, the disable signal can still reliably be set.

In some embodiments, it is envisaged that the disable control logic may be arranged in certain situations to clear the disable signal at some point after it has been set. In one particular embodiment, the data processing apparatus further comprises a system controller, the system controller being operable when a system reset is required to cause the disable control logic to clear the disable signal and the processing logic to be reset to cause a boot process to be performed.

Hence, in such embodiments, the disable control logic can be arranged to clear the disable signal during a hard reset process.

In one embodiment, the data processing apparatus further comprises authentication logic for performing an authentication process with respect to the activities of the processing logic, the processing logic being operable to issue a request to the authentication logic if it wishes to cause the disable signal to be cleared, and the authentication logic being operable to cause the disable control logic to clear the disable signal if the authentication process indicates the request is legitimately issued. Hence, by such an embodiment, software executing on the processing logic can request that the disable signal is cleared, but authentication logic is used to verify that such a request is legitimate before cleaning the disable signal. The authentication logic can perform a variety of tests in order to determine whether the request is legitimately issued, and in one embodiment may be arranged to receive signals from the processing logic indicative of the activities being performed by the processing logic, and to determine based on that information whether any particular request is legitimately issued. This may for example be considered legitimate during a soft reset initiated by the software executing on the processing logic. In one particular embodiment, the authentication logic is provided by the system controller.

The system resources can take a variety of forms. However, in one embodiment, the system resources comprise a plurality of memory regions. In one such embodiment, the access control information in said system control registers provide region descriptors for each memory region, and the write restriction data in a field of the write control register identifies which region descriptors are read only. Such region descriptors will typically identify an address range for the region, and will provide memory attributes and/or access permissions pertaining to that memory region. Each region descriptor may be provided by the contents of a single system control register, but in alternative embodiments a number of system control registers are collectively used to identify each region descriptor.

The manner in which the write control register identifies which region descriptors are read only can take a variety of forms. However, in one embodiment, predetermined priorities are associated with each memory region, such that if any of said memory regions overlap, the region descriptor associated with the overlapping memory region having the higher priority is used, and the write restriction data in said field of the write control register identifies a number of region descriptors which are read only, starting from the region descriptor associated with the highest priority memory region. Accordingly, in such embodiments, a number of region descriptors associated with the highest priority memory regions can be identified in a field of the write control register as being read only regions, with the remaining region descriptors being both readable and writeable by a trusted software routine, for example a software routine executing in a predetermined privileged mode, or in a predetermined privileged mode within the secure domain of a system employing multiple security domains.

In one embodiment, the data processing apparatus has a plurality of domains in which devices of the data processing apparatus can operate, said domains comprising at least a secure domain and a non-secure domain, in the secure domain said devices having access to secure data which is not accessible in the non-secure domain, and said system control register setting routine is a secure routine executed by the processing logic when operating in said secure domain.

In one such embodiment, whichever of the domains the processing logic is operating in, the processing logic has a plurality of modes of operation, and said system control register setting routine is a secure routine executed by the processing logic when operating in a predetermined privileged mode of operation within said secure domain.

In one embodiment, the processing logic can be arranged to switch between operation in the secure domain and operation in the non-secure domain, typically such a switch operation being managed by predetermined code executing in a predetermined privileged mode of operation, in one particular example such code being referred to as monitor code and the predetermined mode of operation being a monitor mode of operation. However, in an alternative embodiment, the processing logic is arranged to receive an externally generated signal which fixes the operation of the processing logic in a particular domain, and hence for example may fix the processing logic to operate in the secure domain. In such embodiment, it is envisaged that the processing logic will only be able to operate in a different domain under certain very limited circumstances, for example following a reset operation.

In one embodiment, the disable signal is further used to directly control the manner in which one or more system resources are used. In particular, in one embodiment, the data processing apparatus further comprises write qualifying logic operable to receive the disable signal, such that when the disable signal is set, the write qualifying logic disables write access to one or more of the system resources. Accordingly, in such embodiments, not only is the disable signal used to lock down the at least one write control register, and thereby lock down selected system control registers, but in addition the disable signal can be used to disable write accesses to one or more of the system resources.

In one such embodiment, the data processing apparatus further comprises interrupt generating logic operable to receive the disable signal, such that when the disable signal is set and an attempt to access said one or more system resources takes place, the interrupt generating logic issues an interrupt signal to indicate the presence of the attempted access. By such an approach, an attempted access to a system resource that is not allowed can be signalled via the issuance of an interrupt signal, which may for example be routed back to the processing logic to indicate to the processing logic the presence of such an unauthorised attempted access to a particular system resource.

Viewed from a second aspect, the technology described in this application provides a processing unit for use in a data processing apparatus in accordance with the first aspect, with the processing unit comprising both the processing logic and the at least one write control register. In addition, in some embodiments, one or more of the system control registers may be provided internally within the processing unit.

Viewed from a third aspect, the technology described in this application provides a data processing apparatus comprising: processing means for executing software routines including a system control register setting routine; a plurality of system control register means for storing access control information for a plurality of system resources available to the processing means when executing at least a subset of said software routines; at least one write control register means containing one or more fields, each field being associated with one or more of the system control register means; disable control means for generating a disable signal, when the disable signal is clear the system control register setting routine being operable to write access control information in said system control register means, and for each of said one or more fields to selectively provide write restriction data in that field; when the disable control means sets the disable signal, the at least one write control register means only being readable by any software routines of said subset, and for each field that has write restriction data therein those associated one or more system control register means indicated by the write restriction data also only being readable by any software routines of said subset.

Viewed from a fourth aspect, the technology described in this application provides a method of protecting system control registers in a data processing apparatus having processing logic for executing software routines, the system control registers storing access control information for a plurality of system resources available to the processing logic when executing at least a subset of said software routines, the method comprising the steps of: providing at least one write control register containing one or more fields, each field being associated with one or more of the system control registers; generating a disable signal; when the disable signal is clear, writing access control information in said system control registers, and for each of said one or more fields selectively providing write restriction data in that field; when the disable signal is set, the at least one write control register only being readable by any software routines of said subset, and for each field that has write restriction data therein those associated one or more system control registers indicated by the write restriction data also only being readable by any software routines of said subset.

DESCRIPTION OF EXAMPLE EMBODIMENTS

Figure 1:
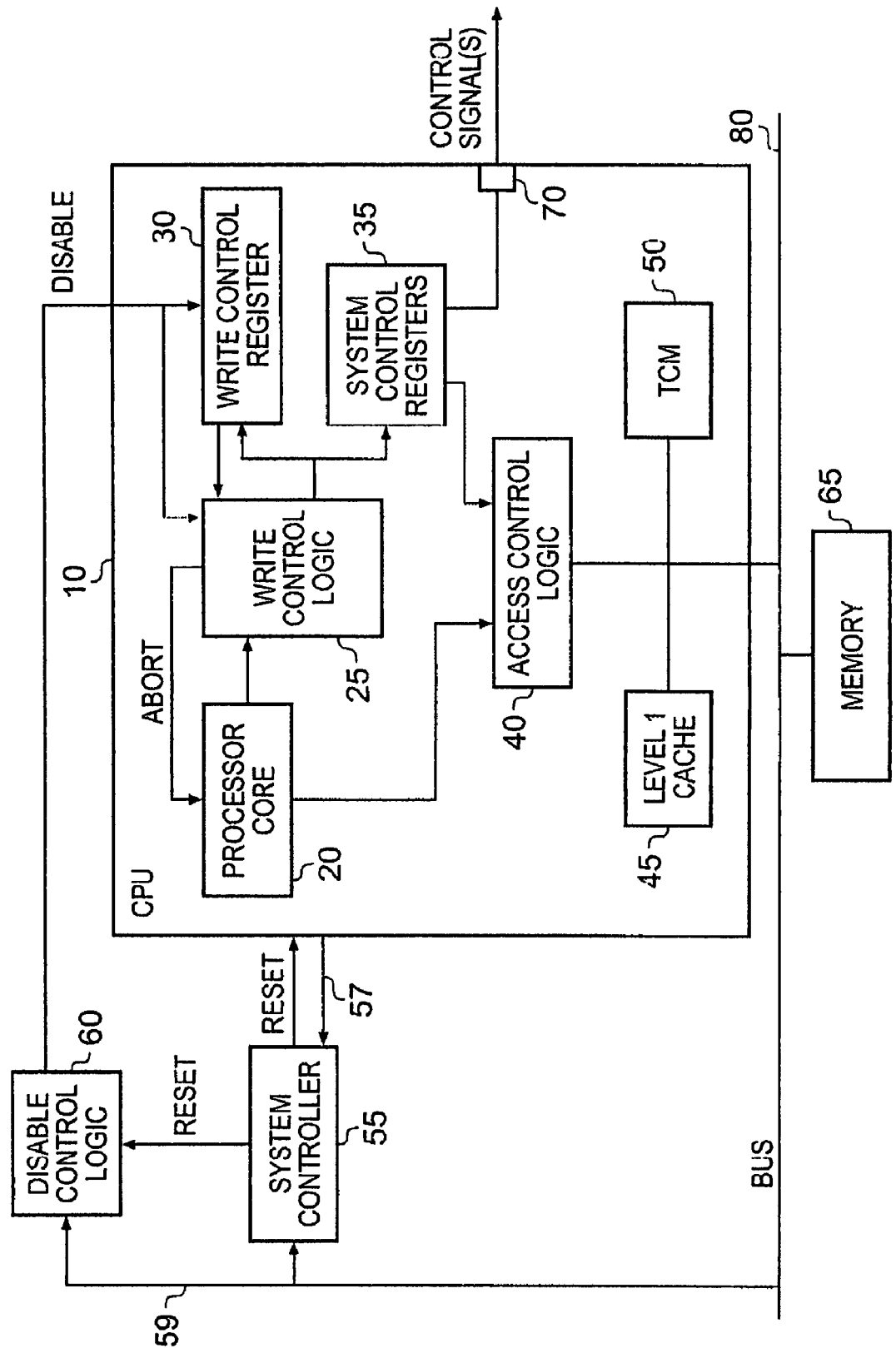
FIG. 1 is a block diagram of a data processing apparatus in accordance with one example embodiment.

FIG. 1 is a block diagram of a data processing apparatus in accordance with one example embodiment. A central processing unit (CPU) 10 is shown connected to a bus 80, via which it can access data values (either instructions or data) stored in the memory system 65. It will be appreciated that the memory system 65 may be arranged as one or more hierarchical levels of memory, and may indeed include one or more system caches. Typically other peripheral devices (for clarity these are not illustrated in FIG. 1) are also connected to the bus 80 to enable the CPU 10 to communicate with such peripheral devices. Collectively, the memory 65 and any other peripheral devices connected to the bus 80 provide a plurality of system resources available to the CPU 10 when executing software thereon.

The CPU 10 has a processor core 20 which can execute a variety of software routines. When the processor core 20 wishes to access data values in either the memory 65 or any peripheral device, connected to the bus 80, that processor core issues an access request specifying an address for the data value or data values the subject of that access request, and this access request is received by the access control logic 40. The access control logic 40 is arranged to determine whether the processor core is allowed in its current operating state to access the specified address, and in making this determination has access to the contents of system control registers 35. The system control registers 35 are used to store access control information for a plurality of system resources available to the processor core. Considering the memory 65, this will typically be partitioned into a number of memory regions, and for each memory region the system control registers will either directly specify region descriptors, or provide pointers to page tables in memory providing those region descriptors. The region descriptor for a particular memory region will typically provide one or more region attributes, identifying for example whether accesses to that region are cacheable, bufferable, etc, and in addition will typically specify one or more access permissions, for example identifying whether the region in question is only accessible when the processor core is in a predetermined operating mode, and if it is accessible whether read and write accesses are allowed or whether only read accesses are allowed, etc.

In systems where the CPU employs virtual addresses when issuing access requests, the access control logic 40 typically takes the form of a memory management unit (MMU), and the relevant system control registers 35 identify page tables containing the earlier described region descriptors, and further identifying virtual to physical address mappings for each region. Assuming the MMU then determines that the access can proceed, it can perform the required virtual to physical address translation prior to issuing the access request, and can also issue in association with that access request any relevant region attributes or access permissions that need propagating over the bus.

If the CPU 10 instead employs physical addresses from the outset, then the access control logic 40 may typically take the form of a memory protection unit (MPU) which is not required to perform any virtual to physical address translation. In such embodiments, certain of the system control registers will often directly provide the region descriptor information required to enable the MPU to determine whether the access can proceed.

As also shown in FIG. 1, the CPU 10 may incorporate a level one cache 45, which may be a unified instruction and data cache, or may be formed as separate instruction and data caches. Typically, for a cacheable access request, the access control logic 40 will cause a lookup procedure to be performed in the level one cache 45 prior to the access request being propagated onto the bus 80, and if the level one cache 40 contains the data value or data values the subject of the access request, then the access proceeds with reference to the level one cache 45 without the need for the access request to be propagated onto the bus 80. If the address specified by the access request relates to a write back region of memory, then the update can take place in the level one cache without at the same time performing the update in memory 65, whereas if the address relates to a write through region, then typically the update will take place in the level one cache 45 and at the same time the access request will also be propagated via the bus 80 to the memory 65 to cause the update to take place in memory.

In addition, the CPU 10 may include a tightly coupled memory (TCM) 50 which occupies a certain region of the memory map. If the address of the access request corresponds to an address within the TCM region of memory, then the access will proceed with reference to the TCM 50 rather than being propagated onto the external bus 80. The TCM can be used to store certain critical pieces of code and data which are specific to the CPU 10, and provides a quick mechanism for accessing that code and data.

Since the contents of the system control registers 35 store access control information for various system resources available to the CPU 10, it is important that the content of those system control registers can only be updated by trusted software executing on the processor core 20. However, whilst it is possible to police access rights to the system control registers so that they are only writeable by code executing in a particular privileged mode of operation, there is still a concern that if that code is somehow tampered with, then it would become possible to alter the contents of the system control registers, which may then allow unauthorised access to certain data.

One possible way of avoiding this is to make the system control registers, or at least a subset of those registers which are considered to be critical, read only after a certain time, for example following a boot process. Whilst this can protect the security of the system control registers, it lacks flexibility, since that subset of system control registers needs to be predetermined.

As discussed earlier, with the aim of seeking to alleviate reliance on operating system security, it is known to provide a system in which the data processing apparatus is provided with separate domains, such as described in the earlier-mentioned U.S. Pat. No. 7,305,534. A secure domain can then be established providing a trusted execution space separated by hardware enforced boundaries from other execution spaces. Within such an environment, the system control registers are typically banked to provide a set of system control registers applicable to the secure domain, and a separate set of system control registers applicable to the non-secure domain. The CPU 10 is then provided with a controlled mechanism for transitioning from the secure domain to the non-secure domain, in particular this being done by monitor code executing in a monitor mode of operation. Such a process is described in detail in the earlier-mentioned US patent application. Accordingly, any software executing in the non-secure domain cannot physically access the system control registers associated with the secure domain. Whilst this protects the secure system control registers from attack by non-secure code executing in the non-secure domain, consideration still has to be given to the possibility of a software attack on the software executing in the secure domain, and the potential that that could lead to unauthorised manipulation of the secure system control registers. With this in mind, it is known to allow a disable signal to be input to the CPU 10 to lock down a predetermined subset of the system control registers as being read only registers. However, again this suffers from the flexibility problems discussed earlier, and only provides a restricted set of usage models.

With the aim of seeking to improve flexibility in how system control registers are protected, an embodiment of the present invention as described in FIG. 1 provides an additional register (in fact this may be one or more registers) referred to as a write control register 30. Disable control logic 60 external to the CPU 10 is then used to generate a disable signal which is routed to the write control register 30 and the write control logic 25. When the disable signal is clear, the processor core 20 can program both the write control register 30 and the system control registers 35 via the write control logic 25, which basically decodes each update request in order to determine which register to write to.

The write control register 30 provides a number of fields, with each field being associated with a predetermined one or more of the system control registers 35. The processor core 20 is able to write restriction data into each of the fields of the write control register 30 identifying whether the associated system control registers should be readable and writeable once the disable signal is set, or should at that time be made read only. When the disable control logic 60 sets the disable flag, the write control register 30 becomes read only, and accordingly the write control logic 25 will prevent any further attempted update to the write control register 30 by software executing on the processor ore 20. In addition, the contents of the write control register 30 are made available to the rite control register 25, so that if subsequently the processor core 20 seeks to update one of the system control registers 35, the write control logic 25 can determine with reference to the write control register 30 whether that register is still writable to, or if instead it has been locked down as a read only system control register. In the event that the write is allowed to proceed, the system control register can be updated, but in the event that the write control register 30 indicates that that system control register is now read only, the write control logic 25 will be arranged to issue an abort signal to the processor core 20.

In one embodiment, not all of the system control registers 35 will be associated with fields in the write control register 30, and hence certain of the system control registers can merely be arranged to always be read only when the disable signal is set, or indeed some can be arranged to always be readable and writeable irrespective of the setting of the disable flag. However it will be appreciated that for any system control registers that are associated with the fields of the write control register 30, then the choice as to whether those registers become read only when the disable flag is set, or remain readable and writeable, is programmable by appropriately trusted software executing on the processor core 20 whilst the disable flag is clear, by appropriate programming of the fields of the write control register 30. This hence provides a great deal of flexibility as to how access to individual system control registers is managed.

As shown in FIG. 1, a system controller 55 is provided which is able under certain circumstances to issue a reset signal to the CPU 10 and/or a reset signal to the disable control logic 60. The system controller 55 can also receive requests to reset the disable control logic 60 from the CPU 10 via the bus 80, and as will be discussed later is arranged in such circumstances to apply authentication techniques in order to decide whether that request from the CPU is legitimate and accordingly the disable control logic should be reset.

Upon a reset of the disable control logic 60, the disable control logic 60 is arranged to issue a clear disable signal, thereby allowing write access to both the write control register 30 and the system control registers 35. At some subsequent point, either the system controller or the CPU 10 can issue a signal over path 59 to the disable control logic 60 to cause the disable control logic 60 to issue a set disable signal, thereby locking down the contents of the write control register 30 and any system control registers identified in the write control register 30 as being read only.

In one embodiment, the write control register 30 and the system control registers 35 are initially written to by secure system control register setting software executing on the processor core 20 as part of a boot process, and during the boot process the disable control logic 60 is arranged to issue a clear disable signal to allow this writing to take place. In one embodiment, during the boot process, the system controller 55 starts a timer, and following the elapse of the timer, the system controller 55 is arranged over path 59 to issue a signal to the disable control logic to cause the disable control logic to issue a set disable signal. Alternatively, the software executing on the processor core 20 during the boot process may be arranged to issue via the bus 80 and path 59 a signal to the disable control logic 60 to cause the disable control logic 60 to issue a set disable signal when writing to the write control register 30 and system control registers 35 has been completed. The timer technique can also be combined with such an approach, so that if the boot process fails at some point, the elapse of the timer will still cause the disable signal to be set. Alternatively, the disable control logic 60 may be arranged to receive an external off-chip signal that is used to set the disable signal.

If subsequently a hard reset process is invoked, the system controller 55 will typically issue a reset signal to the CPU 10 and issue a reset signal to the disable control logic 60, the receipt of the reset signal by the disable control logic 60 causing the disable signal to be cleared. Similarly, if a soft reset procedure is initiated by software on the processor core 20, this will cause the system controller 55 to issue a reset signal to the CPU 10, and optionally may cause the system controller 55 to issue a reset signal to the disable control logic 60.

As another alternative, secure software executing on the processor core 20 may issue a request to the system controller 55 to request the clearing of the disable signal. In such a scenario, the system controller acts as authentication logic to seek to authenticate that the request from the CPU 10 is legitimate. To do this, the system controller may be arranged to receive authentication information over path 57 from the CPU 10, this authentication information for example taking the form of trace data indicating the activities of the CPU 10. Alternatively, or in addition, the system controller 55 can perform a cryptographic process in order to determine whether the disable flag should be allowed to be cleared, and accordingly whether a reset signal should be issued to the disable control logic 60. As an example of a legitimate reason why the software executing on the CPU 10 may wish to alter the contents of the system control register 35, some new software may have been installed which would require the updating of some of the content of the system control registers. In such situations, the system controller may determine from the authentication information it receives over path 57 that the request is legitimate, and accordingly will issue the reset signal to the disable control logic 60.

The disable control logic can be arranged in a variety of ways, but in one embodiment is arranged as a sticky register such that following the reset signal, it issues a logic zero value. Thereafter, if it receives a logic one value over path 59, it outputs a logic one value indicating a set state of the disable signal. Thereafter, if the value on path 59 returns to a logic zero value, the output from the disable control logic is unchanged, and accordingly the disable flag stays set. The only way to clear the disable flag is then for the reset signal to be issued to the disable control logic 60 from the system controller 55.

Whilst in the previous description, the system control registers are defined as providing access control information which is used by the access control logic 40 when processing access requests, it is also possible that the system control registers contain additional access control information pertaining to certain system resources, and such access control information can be routed via pin 70 off-chip to form control signals used to influence the operation of various system resources. As an example, these control signals may disable write access to a particular memory device, or alternatively may specify certain access privileges applicable to a debug mode of operation. Again, from a security standpoint, it is useful to provide a mechanism whereby these types of system control registers can selectively be programmed as read only registers such that one the disable flag is set, the contents of those registers cannot be changed.

Whilst in FIG. 1, the system control registers 35 are shown as a single block of registers, it will typically be the case that these system control registers will not physically be located in one place, but may be dispersed throughout the data processing apparatus. Indeed, whilst some of the system control registers may be provided within the CPU 10, other system control registers may be provided externally to the CPU 10. However, the above described operation is still applicable irrespective of the actual physical location of any particular system control register.

For embodiments where the CPU 10 can operate in either a secure domain or a non-secure domain, the write control register 30 may be provided in association with the secure system control registers to help protect them from unauthorised manipulation by software executing in the secure domain. If considered appropriate, an additional write control register can also be provided in association with the non-secure system control registers. In such an embodiment, control register setting software executing in the secure domain would typically be allowed to overwrite the non-secure write control register applicable to the non-secure domain, but would usually allow control register setting software executing in the non-secure domain to write to that non-secure write control register. In one embodiment the CPU 10 could be provided with separate disable signals, one for the secure domain and one for the non-secure domain, or alternatively the CPU 10 could receive a single disable signal applicable to the secure domain, and secure software would then generate an internal disable signal applicable to the non-secure domain (for example by storing a value in a register accessible only in the secure domain which produces that signal).

Whilst in one embodiment the CPU 10 has been described as being capable of executing in either the secure domain or the non-secure domain, with monitor code being used to transition between the two domains, and with banked versions of the system control registers 35 being provided, in an alternative embodiment the CPU 10 has a more simple design, and is fixed to operate in one domain or the other. Typically, once fixed in one domain, it will not be able to operate in the other domain unless it is reset. In such embodiments, the CPU 10 would typically only include a single set of system control registers 35, and the content of those system control registers would be cleared during the reset operation. The above described technique of embodiments of the present invention is equally applicable to a CPU arranged in such a manner, since for the particular domain of operation of the CPU 10, it provides a flexible mechanism for programming accessibility to individual system control registers, so that certain control registers could be chosen to become read only following the setting of the disable flag. Thereafter, for any system control register which is indicated by the contents of the write control register 30 as being read only, any software routines executing on the processor core will not be able to alter the content of those system control registers once the disable flag has been set, thereby providing an enhanced level of security to those system control registers.

The write control register can be used irrespective of which domain the CPU is fixed in, but in one embodiment the write control register is only used when the CPU is fixed in the secure domain, to provide flexibility in the choice of system control registers which are read only in the secure domain.

Figure 2:
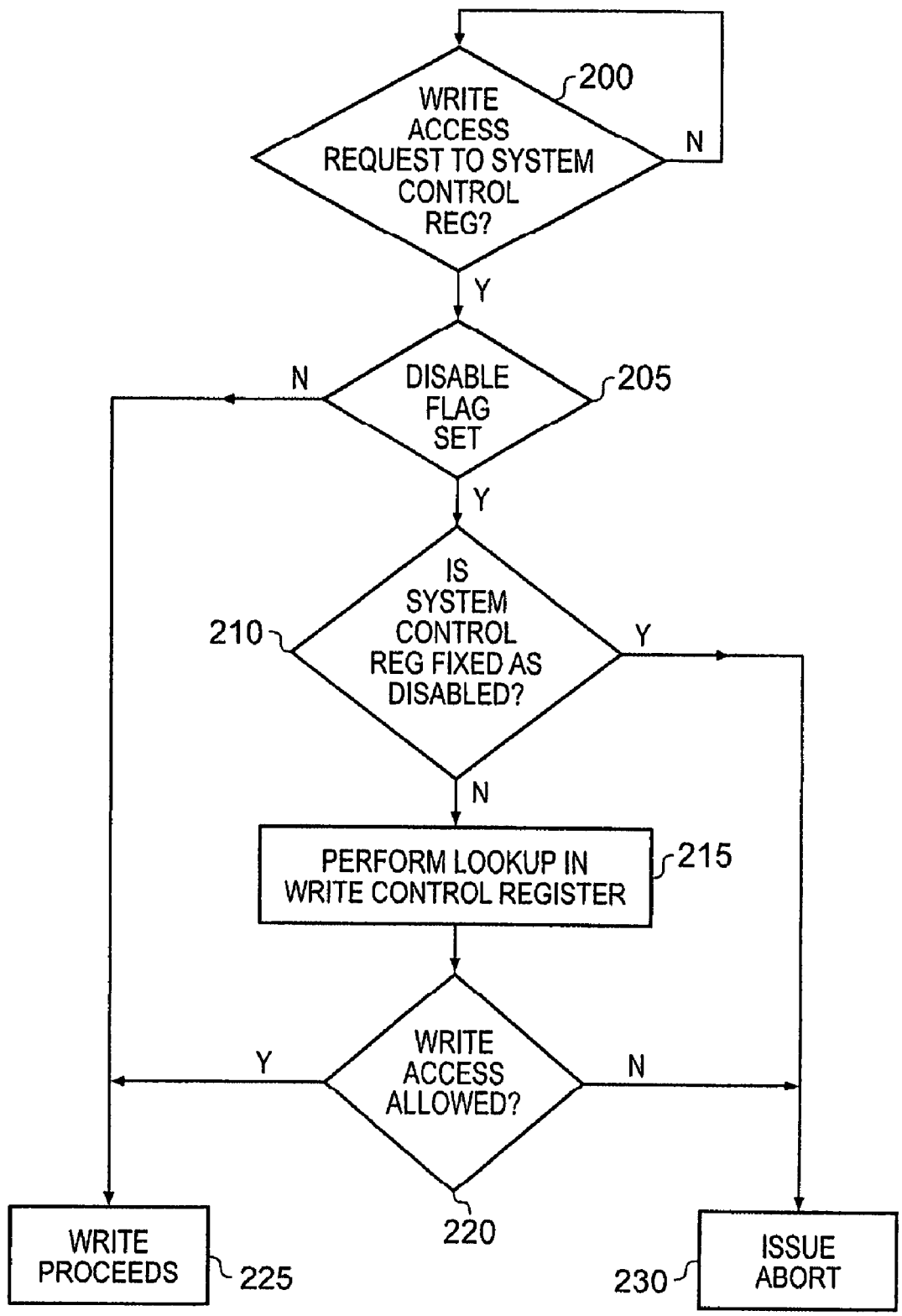
FIG. 2 is a flow diagram illustrating the operation of the write control logic of FIG. 1 in accordance with one example embodiment.

FIG. 2 is a flow diagram illustrating the operation of the write control logic 25 of FIG. 1 in accordance with one example embodiment. At step 200, a write access request to one of the system control registers is received by the write control logic 25 from the processor core 20. Thereafter, at step 205 it is determined whether the disable flag is set. If the disable flag is not set, then the process proceeds directly to step 225, where the write is allowed to proceed.

However, if the disable flag is set, then the process proceeds to step 210, where it is determined whether the system control register seeking to be accessed is a register which is fixed as being write disabled (i.e. is not a register that has its access rights programmed via the contents of the write control register 30). If the system control register is fixed as write disabled, then the process proceeds directly to step 230, where the write control logic 25 issues an abort to the processor core 20.

However, assuming that the system control register is not fixed as being write disabled, then at step 215 the write control logic 25 performs a lookup in the write control register 30 in order to access the relevant field of the write control register and thereby determine whether the system control register in question is marked as read only or not. Accordingly, at step 220 it is determined with reference to the relevant entry of the write control register 30 whether the write access is allowed, and if so the process proceeds to step 225 where the write access proceeds, whereas otherwise the process proceeds to step 230 where an abort is issued to the processor core 20.

Figures 3A, 3B:
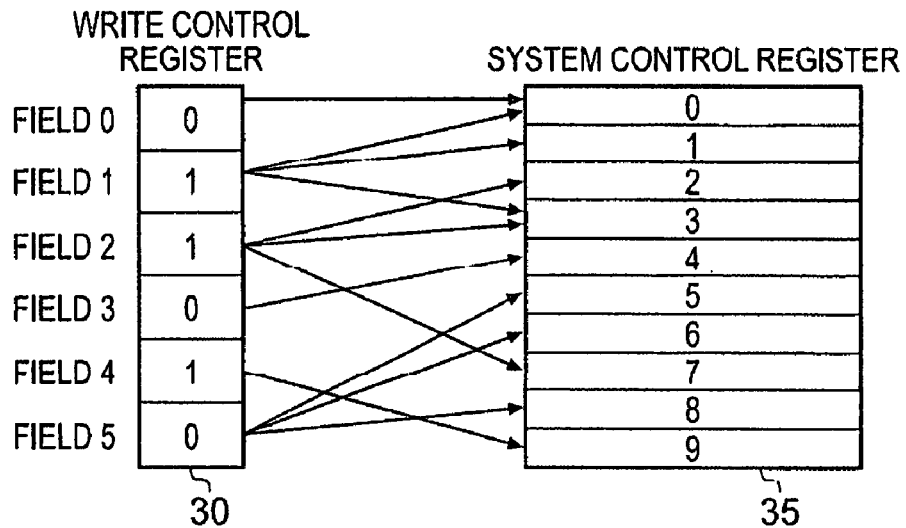
FIGS. 3A and 3B illustrate how the contents of the write control register of FIG. 1 determine the allowability of write accesses to individual system control registers in accordance with one example embodiment.

FIGS. 3A and 3B are diagrams illustrating the flexibility afforded through use of the fields of the write control register 30. In this particular example, certain fields map to a specific system control register, whilst other fields map to groups of system control registers. In this example embodiment, the write restriction data written to each field of the write control register consists of a single bit field, with a logic zero value indicating that the associated system control register or system control registers are readable and writeable when the disable flag is set, whilst a logic one value indicates that the associated system control register or system control registers will become read only once the disable signal is set.

FIG. 3A illustrates an example mapping between each field of the write control register and associated system control registers 35, and FIG. 3B is a table illustrating what effect the particular sequence of programming of the write control register 30 illustrated in FIG. 3A has on the accessibility of the system control registers 35 following setting of the disable signal. In particular, it can be seen that the logic one value written into field one of the write control register 30 disables write access to system control registers 0, 1 and 3, whilst similarly the logic one value written to field two of the write control register 30 disables write access to system control registers 2, 3 and 7. Furthermore, the logic one value written to field four of the write control register 30 disables write access to the system control register 9. It should be noted that some overlapping in the mapping is allowed, and hence for example field 0 is associated with system control register 0 and field 1 is also associated with system control register 0. In such situations, a logical OR operation is performed on the values in the relevant fields of the write control register in order to determine whether the associated system control register is read only or not. Hence, considering system control register 0, even though field 0 indicated that that control register should be readable and writeable, the fact that field 1 indicates that it should be read only ensures that the system control register 0 becomes read only following the setting of the disable signal.

As a result of the particular example of programming of the write control register 30 illustrated in FIG. 3A, it can be seen from FIG. 3B that only system control registers 4, 5, 6 and 8 are readable and writeable following setting of the disable signal. As discussed previously, not all of the system control registers need to be mapped into fields of the write control register, and accordingly there can be additional system control registers which will always be read only when the disable flag is set, and indeed there may be other system control registers which are always readable and writeable irrespective of whether the disable flag is set.

Whilst in FIGS. 3A and 3B the write control register 30 is shown as having six fields, the actual number of fields in any particular embodiment can be selected as appropriate.

Figure 4:
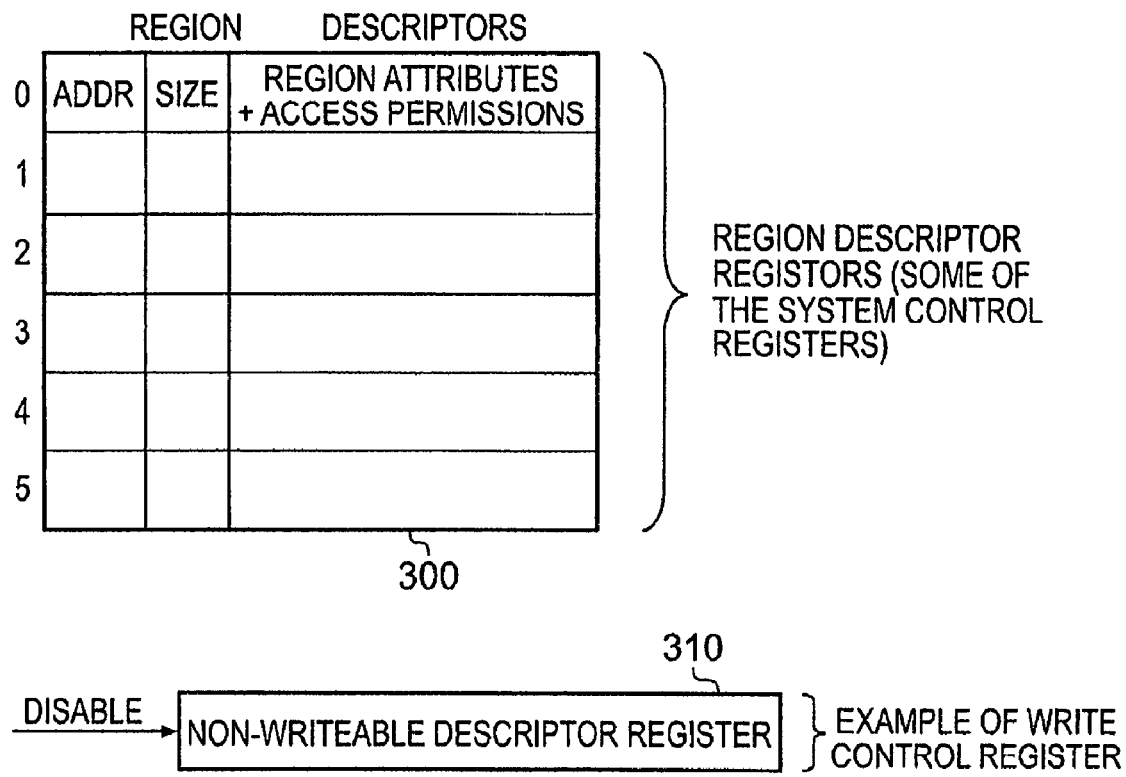
FIG. 4 schematically illustrates a particular implementation of the write control register and system control registers in accordance with one example embodiment.

FIG. 4 illustrates a particular example implementation of the write control register 30 of FIG. 1. In this particular example implementation, it is assumed that the CPU 10 is a CPU which is fixed to operate in either a secure domain or a non-secure domain, and accordingly contains one set of system control registers. Further, in this embodiment the CPU 10 uses physical addresses, and accordingly the access control logic 40 takes the form of an MPU, with certain of the system control registers 35 providing region descriptors giving region attributes and access permissions for particular address ranges. Accordingly, the system control registers 35 will include a number of region descriptor registers which for each region will specify an address value, a size value, region attributes and access permissions. The address and size value collectively identify a memory region. Typically, the address value, size value, region attributes and access permissions defining one region descriptor are provided by the contents of more than one system control register. The write control register 30 in this embodiment takes the form of a non-writeable descriptor register 310, which is programmed with a value "M" identifying the number of region descriptors which are to become read only following setting of the disable flag.

In accordance with this embodiment, priorities are associated with each of the region descriptors, as indicated by the numbers 0 to 5 at the left hand side of the region descriptors 300 shown in FIG. 4. The region descriptor having the highest number is considered to have the highest priority. By attributing priorities to the different regions, it is possible to define the regions so that they overlap. For example, the region associated with the region descriptor having the priority of 5 may at least partially overlap the region associated with the region descriptor having the priority of 3. For any address falling within that overlap range, the region attributes and access permissions of the region descriptor having the higher priority are applied (i.e. those provided by the region descriptor having the priority of 5 in this example). It will typically be important that a certain number of the higher priority region descriptors are particularly secure, and accordingly whilst it may not be considered necessary to make all of the region descriptors read only, it will typically be considered appropriate to have at least a certain number of the higher priority region descriptors marked as read only.

Hence, in accordance with this embodiment, if the total number of region descriptors is "N", then when the disable signal is set, the write control logic 25 will access the contents of the non-writeable descriptor register 310, and will determine that the registers N-1 to N-M are read only and the registers N-M-1 to 0 are readable and writeable. As mentioned earlier, each region descriptor will not necessarily be stored in only a single register, and accordingly when referring to registers N-1 to N-M or registers N-M-1 to 0, this is actually a reference to any registers required to specify region descriptors N-1 to N-M or region descriptors N-M-1 to 0, respectively. Accordingly, if a write access to one of the region descriptor registers is issued by the processor core 20, the write control logic 25 will determine whether the region descriptor register in question is one which is read only, or read/writeable, and only if the region descriptor register in question is read/writeable will the access be allowed to proceed. Otherwise an abort signal will be issued by the write control logic 25 to the processor core 20.

Whilst it will be appreciated that the non-writeable descriptor register 310 can be used irrespective of whether the CPU 10 is fixed in the non-secure domain or fixed in the secure domain, it is envisaged in one embodiment that the non-writeable descriptor register 310 is only used when the CPU 10 is fixed in the secure domain and hence is only used to control access to system control registers used when the processor core 20 is executing secure applications in the secure domain.

Figure 5:
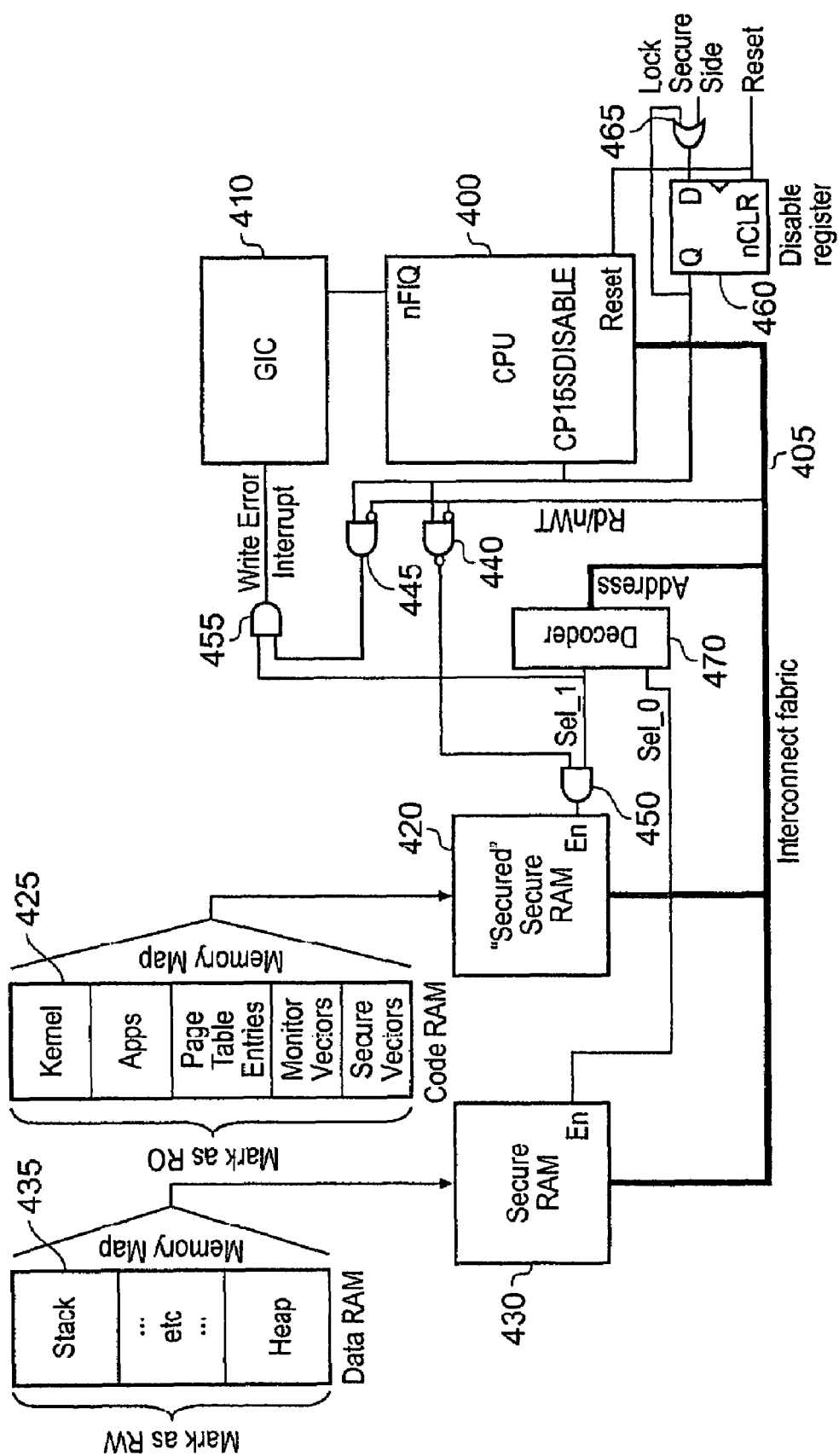
FIG. 5 is a block diagram of a data processing apparatus in accordance with a further example embodiment.

FIG. 5 is a block diagram of a data processing apparatus in accordance with a second example embodiment. The CPU 400 is arranged in the same manner as the CPU 10 discussed earlier with reference to FIG. 1, and in accordance with this embodiment is arranged to be operable in either a secure domain or a non-secure domain. The CPU 400 of FIG. 5 is assumed to use virtual addressing, and hence page table entries will be provided in memory identifying for each memory region the address translation, region attributes and access permissions applicable to that region. The CPU 400 is connected via the bus 405 with two memory devices, namely secure RAM 430 and secure RAM 420. The secure RAM 420 is arranged to store code and has a memory map as shown by element 425. Via the write control register within the CPU 400, the system control registers identifying the location of the page tables, monitor vectors and secure vectors are marked as read only. The secure vectors and monitor vectors define the addresses of code to handle exceptions such as interrupts.

The page table entries obtained by the CPU will identify that part of the memory map associated with the secure RAM 420 as read only (including the page table entries themselves), and that part associated with the set-ire RAM 410 as readable/writeable.

In the secure RAM 430, the memory map is as shown by element 435, and consists of various stacks and heaps referred to when executing code in the secure domain on the CPU 400. The relevant page table entries for these memory regions mark them as readable/writable.

Since the use of the write control register to set various of the system control registers as read only when the disable signal is set ensures that the location of the page tables cannot be altered, the page tables themselves are marked as read only, and the relevant page table entries for the part of the memory map 425 mark that part as read only, then logically the CPU 400 is not able to alter the content of the secure RAM 420. However, other bus masters, such as a DMA, which can access the secure RAM 420 without reference to the page tables, may attempt a write access to the secure RAM 420. Additionally, there is still the possibility that unauthorised or hacked software executing in the secure domain on the CPU 400 may exploit a hardware and/or software loophole to seek to write to an address within the secure RAM 420. An access request issued by the CPU 400 or another bus master when executing in the secure domain may in that event be routed over bus 405 to the decoder 470 which will then issue an enable select signal to either the secure RAM 430 or the secure RAM 420, dependent on the address. Whilst write accesses to the secure RAM 430 are intended to be allowed, the code in the secure RAM 420 is intended to be read only, and accordingly as a further security measure it would be desirable in certain situations to prevent that RAM 420 being enabled if a write access is attempted to it.

In accordance with one example embodiment, this is achieved by re-using the disable signal generated by the disable control logic. The disable control logic is illustrated by the elements 460, 465 in FIG. 5. As will be appreciated, if a lock signal initially takes a logic zero value following a reset, and that lock signal is routed as one input to the OR gate 465, this will cause the output from the register 460 to be at a logic zero value, i.e. indicating a clear disable signal. From the earlier discussion of FIG. 1, this will allow the write control register and system control registers within the CPU to be written to by secure software executing on the CPU 400. Subsequently, the disable signal will be set by issuing a lock value to the OR gate 465 having a logic one value. Thereafter, due to the feedback loop from the output of the register 460 to the other input of the OR gate 465, even if that lock signal were subsequently returned to a logic zero value, the output from the register 460 would still stay at a logic one value until such time as a reset signal is issued, as discussed earlier this reset signal being issued by a system controller 55 which may employ some cryptographic process to authenticate any requests for a reset.

As can be seen from FIG. 5, the disable signal is routed as one input to both AND gate 445 and NAND gate 440. The other input of both gates 445 and 440 is formed by an inverted version of a read or not-write signal, where the read or the write signal take a logic one value when a read or a write access request is issued, respectively. Considered NAND gate 440, it will be appreciated that if a read request is issued, the inversion of the read signal at the input to the NAND gate will ensure that even when the disable signal is set, the output from the NAND gate is a logic one value and as a result if the decoder issues a set select signal to the AND gate 450, this enable signal will be passed on to the secure RAM 420 to enable the read to take place.

However, if a write access request is made, then the inverter at the input to NAND gate 440 will ensure that that input to the NAND gate is a logic one value. Accordingly, if at the same time the disable signal is set, both inputs to the NAND gate will be a logic one value, and accordingly a logic zero value will be output from the NAND gate 440, which will cause a logic zero value to be output from AND gate 450 irrespective of the enable signal generated by the decoder 470. Accordingly, by this mechanism, write qualifying logic formed by the NAND gate 440 and AND gate 450 will prevent a write access to the secure RAM 420 when the disable signal is set, and as such the RAM 420 can be considered to be a "secured" secure RAM. This hence provides an additional level of security for the RAM 420.

In accordance with one example embodiment, a general interrupt controller 410 is provided for issuing interrupts to the CPU 400. In accordance with this embodiment of the present invention, interrupt generating logic in the form of AND gate 445 and AND gate 455 is provided to generate a write error interrupt to the general interrupt controller 410 in the event that an unauthorised write access is attempted to the secured secure RAM 420. In particular, considering AND gate 445, it will be appreciated that when a write access request is issued, this will cause a logic one value to be output from the AND gate 445 if at the same time the disable signal is set, and if at the same time the decoder 470 issues an enable signal associated with the secured secure RAM 420, this will cause the AND gate 455 to assert a logic one signal to the general interrupt controller 410, this signal being a write error interrupt signal. The general interrupt controller can then forward this interrupt to the CPU 400 to cause an appropriate exception routine to be run to take whatever actions are considered appropriate upon the occurrence of such a write error, e.g. log the information, reboot the CPU 400, or enter a failsafe mode of operation (typically with reduced functionality).

From the above description of example embodiments, it will be appreciated that through the provision of a write control register, a great deal of flexibility can be provided for the programming of access rights to particular system control registers. By selecting certain system control registers to be read only once a disable signal is set, and by further making the write control register read only when that disable signal is set, this provides an enhanced level of security, and in particular avoids certain key system control registers from being altered through malicious attack. Since the system control registers contain access control information with regard to certain system resources, this avoids the system resources being accessed incorrectly. Hence, a malicious piece of code executing on the processor core cannot alter the system control register contents in a way that would cause the access control logic 40 to allow access to key system resources by that malicious code. In accordance with one further enhancement as discussed above with reference to FIG. 5, even if by some mechanism that malicious code were able to align itself with the access permissions stored in the relevant system control registers (for example by executing in a particular privileged mode that would in theory allow access to the system resources), write access can still be prevented to such sensitive system resources through use of the mechanism described in FIG. 5 in relation to the secure RAM 420.

Whereas in accordance with prior art schemes, only a certain fixed set of system control registers could be locked as read only, the use of the write control register 30 introduces a level of indirection to the process, that provides a programmer with much more flexibility as to which particular system control registers should become read only.

In one embodiment, rather than providing a write control register 30 within the CPU 10, such a write control register could be provided externally to the CPU 10, with the contents of that write control register being used to drive appropriate control pins at the edge of the CPU 10.

Through use of the write control register 30 of embodiments of the present invention, the use of that hardware register, in combination with the software executing on the processor core and the programmer's attitude to risk, can be combined to determine what exact combination of system control registers should be locked down as read only for any particular implementation, thus providing a great deal of flexibility. In particular, such a mechanism enables a loosening or tightening of any default lock down mechanism (for example typically there may be a predetermined number of the system control registers which are always locked down as read only).

When considering the particular embodiment discussed earlier with reference to FIG. 4, the mechanism of that embodiment enables the locking of only certain high priority memory region descriptors as read only, with the exact number of memory region descriptors locked being dependent on the value stored in the non-writeable descriptor register 310.

Additionally, given that the above described embodiments provide mechanisms for resetting the disable control logic 60 under certain conditions, such embodiments facilitate temporal configuration of which system control registers are locked, thereby allowing a dynamic authentication model with fine granularity of resource locking.

Although particular embodiments have been described herein, it will be appreciated that the claims are not limited thereto and that many modifications and additions thereto may be made within their scope.

We claim:

1. A data processing apparatus comprising:
processing logic for executing software routines including a system control register setting routine;
a plurality of system control registers for storing access control information for a plurality of system resources available to the processing logic when executing at least a subset of said software routines;
at least one write control register containing one or more fields, each field being associated with one or more of the system control registers; and
disable control logic for generating a disable signal, wherein when the disable signal is clear the system control register setting routine is configured to write access control information in said system control registers, and for each of said one or more fields contained in the at least one write control register, to selectively enter write restriction data in that field;
wherein when the disable control logic sets the disable signal, the at least one write control register is only readable by any software routines of said subset, and for each field that has write restriction data therein, those associated one or more system control registers indicated by the write restriction data are only readable by any software routines of said subset.

2. A data processing apparatus as claimed in claim 1, wherein the system control register setting routine is executable as part of a boot process, and during said boot process the disable signal is clear.

3. A data processing apparatus as claimed in claim 2, wherein the disable control logic is configured to set the disable signal following elapse of a timer started during said boot process.

4. A data processing apparatus as claimed in claim 2, wherein the disable control logic is configured to set the disable signal on receipt of a signal issued by the processing logic during said boot process.

5. A data processing apparatus as claimed in claim 1, further comprising a system controller, the system controller being configured when a system reset is required to cause the disable control logic to clear the disable signal and the processing logic to be reset to cause a boot process to be performed.

6. A data processing apparatus as claimed in claim 1, further comprising authentication logic for performing an authentication process with respect to the activities of the processing logic, the processing logic being configured to issue a request to the authentication logic if it wishes to cause the disable signal to be cleared, and the authentication logic being configured to cause the disable control logic to clear the disable signal if the authentication process indicates the request is legitimately issued.

7. A data processing apparatus as claimed in claim 6, wherein the authentication logic is a system controller.

8. A data processing apparatus as claimed in claim 1, wherein said system resources comprise a plurality of memory regions.

9. A data processing apparatus as claimed in claim 8, wherein the access control information in said system control registers provide region descriptors for each memory region, and the write restriction data in a field of the write control register identifies which region descriptors are read only.

10. A data processing apparatus as claimed in claim 9, wherein:

predetermined priorities are associated with each memory region, such that if any of said memory regions overlap, the region descriptor associated with the overlapping memory region having the higher priority is used; and
the write restriction data in said field of the write control register identifies a number of region descriptors which are read only, starting from the region descriptor associated with the highest priority memory region.

11. A data processing apparatus as claimed in claim 1, wherein the data processing apparatus has a plurality of domains in which devices of the data processing apparatus can operate, said domains comprising at least a secure domain and a non-secure domain, in the secure domain said devices having access to secure data which is not accessible in the non-secure domain, and said system control register setting routine is a secure routine executed by the processing logic when operating in said secure domain.

12. A data processing apparatus as claimed in claim 11, wherein whichever of the domains the processing logic is operating in, the processing logic has a plurality of modes of operation, and said system control register setting routine is a secure routine executed by the processing logic when operating in a predetermined privileged mode of operation within said secure domain.

13. A data processing apparatus as claimed in claim 12, wherein said processing logic is fixed to operate in said secure domain.

14. A data processing apparatus as claimed in claim 1, further comprising write qualifying logic configured to receive the disable signal, such that when the disable signal is set, the write qualifying logic disables write access to one or more of the system resources.

15. A data processing apparatus as claimed in claim 14, further comprising interrupt generating logic configured to receive the disable signal, such that when the disable signal is set and an attempt to access said one or more system resources takes place, the interrupt generating logic is configured to issue an interrupt signal to indicate the presence of the attempted access.

16. A processing unit for use in a data processing apparatus as claimed in claim 1, the processing unit comprising said processing logic and said at least one write control register.

17. A data processing apparatus comprising:
processing means for executing software routines including a system control register setting routine;
a plurality of system control register means for storing access control information for a plurality of system resources available to the processing means when executing at least a subset of said software routines;
at least one write control register means containing one or more fields, each field being associated with one or more of the system control register means;
disable control means for generating a disable signal, when the disable signal is clear the system control register setting routine being operable to write access control information in said system control register means, and for each of said one or more fields contained in the at least one write control register to selectively enter write restriction data in that field;
when the disable control means sets the disable signal, the at least one write control register means only being readable by any software routines of said subset, and for each field that has write restriction data therein those associated one or more system control register means indicated by the write restriction data also only being readable by any software routines of said subset.

18. A method of protecting system control registers in a data processing apparatus having processing logic for executing software routines, the system control registers storing access control information for a plurality of system resources available to the processing logic when executing at least a subset of said software routines, the method comprising the steps of:

providing at least one write control register containing one or more fields, each field being associated with one or more of the system control registers;

generating a disable signal;

when the disable signal is clear, writing access control information in said system control registers, and for each of said one or more fields contained in the at least one write control register entering selectively write restriction data in that field;

when the disable signal is set, the at least one write control register only being readable by any software routines of said subset, and for each field that has write restriction data therein those associated one or more system control registers indicated by the write restriction data also only being readable by any software routines of said subset.

* * * * *